| United States Patent [19] | [11] Patent Number: 4,550,058 |
| Collins et al. | [45] Date of Patent: Oct. 29, 1985 |

[54] SOFT TOP COATED SHAPED POLYCARBONATE ARTICLE

[75] Inventors: Patrick C. Collins; John M. Gasaway, both of Pittsfield, Mass.

[73] Assignee: General Electric Company, Mt. Vernon, Ind.

[21] Appl. No.: 547,344

[22] Filed: Oct. 31, 1983

[51] Int. Cl.$^4$ .................. B32B 27/36; B32B 27/10; B32B 27/08

[52] U.S. Cl. .................. 428/412; 428/476.1; 428/474.4; 428/475.8; 428/448; 428/451; 428/414; 428/429.6; 428/424.7; 428/424.8; 428/424.2; 428/517; 428/518; 428/519; 428/520; 428/483; 428/462

[58] Field of Search .................. 428/412, 476.1, 474.4, 428/518, 519, 517, 475.8, 520

[56] References Cited

U.S. PATENT DOCUMENTS

| 3,840,427 | 10/1974 | Brazier et al. | 428/476.1 |
| 4,322,476 | 3/1982 | Molari, Jr. | 428/412 |
| 4,361,625 | 11/1982 | Beckmann et al. | 428/412 |
| 4,416,942 | 11/1983 | DiLuccio | 428/412 |

*Primary Examiner*—Patricia C. Ives
*Attorney, Agent, or Firm*—Myron B. Kapustij; Martin B. Barancik

[57] ABSTRACT

Soft coated shaped polycarbonate articles exhibiting improved resistance of the polycarbonate substrate to degradation by the plasticizers contained in the relatively soft top coat comprised of, in combination:

(i) a shaped polycarbonate substrate;

(ii) a protective intermediate layer disposed on said polycarbonate substrate comprised of at least one ply of a resinous material exhibiting plasticizer barrier properties, thermoformability, heat resistance, and compatibility with the underlying polycarbonate; and (iii) a relatively soft plasticized top coat comprised of at least one resinous material disposed on said intermediate layer.

The substrate, intermediate layer, and top coat are all bonded together by means of suitable adhesives.

12 Claims, No Drawings

SOFT TOP COATED SHAPED POLYCARBONATE ARTICLE

BACKGROUND OF THE INVENTION

In many applications shaped polycarbonate articles have a soft skin or outer layer disposed thereon in order to improve their aesthetic appeal. The soft coating most often utilized for reasons of economy and ease of fabrication contains polyvinyl chloride resin, either alone or blended with other resins such as acrylonitrile-butadiene-styrene. In order to render this coating flexible certain chemical plasticizers are often added to this outer layer. However, when this soft outer layer is bonded to the polycarbonate substrate there is inevitably some migration of the plasticizers into the polycarbonate. This results in chemical degradation of the polycarbonate resin and the resultant loss of its advantageous mechanical and physical properties.

There thus exists a need for a shaped polycarbonate article having a soft plasticized outer layer disposed on its surface wherein the polycarbonate substrate is protected from the deleterious affects of the plasticizers present in the soft coating layer. It is an object of this invention to provide such a coated polycarbonate article.

BRIEF SUMMARY OF THE INVENTION

The instant invention is directed to shaped polycarbonate articles having a plasticized soft coating disposed on their surface wherein the polycarbonate substrate is protected from the adverse affects of the plasticers contained in the soft coating. The instant soft coated polycarbonate articles are comprised of:

(i) a polycarbonate substrate;
(ii) a relatively thin protective intermediate layer exhibiting gas-barrier properties bonded to the polycarbonate substrate; and
(iii) a relatively soft plasticized top coat bonded to said intermediate layer.

DESCRIPTION OF THE INVENTION

It has been discovered that interposing an intermediate layer which exhibits gas-barrier properties between a polycarbonate substrate and a relatively soft top coat disposed on said substrate and comprised of a plasticized resinous material protects the polycarbonate from the deleterious affects of any migrating plasticizer material.

The instant invention finds application in those areas where a shaped polycarbonate substrate has adhered to its outer surface a relatively soft top coat or skin. One example of such a composite structure is an automobile instrument panel. Polycarbonate, due to its many excellent mechanical properties and light weight, is begining to replace many metal parts in automobiles, such as for example instrument panels. To improve the aesthetic appearance of these polycarbonate parts a relatively soft outer skin is bonded to the polycarbonate substrate. This soft outer skin is relatively softer and more pleasing to the eye and touch than the underlying rather hard and unyielding polycarbonate substrate. This outer skin is normally comprised of a resinous material such a polyvinyl chloride, or a blend of polyvinyl chloride and other resins such as acrylonitrile-butadiene-styrene. In order to render this outer skin flexible plasticizers are generally included therein. There is normally some migration of these plasticizers from the outer skin to the underlying polycarbonate substrate. These plasticizers may generally have a deleterious affect on the polycarbonate, usually adversely affecting some of the advantageous properties of the polycarbonate. This migration is generally somewhat accelerated by high temperatures. Since the temperature in the closed interior of an automobile, especially in the summer or in hot climes, may reach 235° F., the problem of plasticizer migration is particularly acute when soft coated polycarbonate parts are utilized in automobile interiors.

The structures of the instant invention remedy this problem of plasticizer migration, particularly under high temperature conditions. The instant invention is comprised of an improved soft coated shaped articles exhibiting improved resistance to plasticizer migration containing:

(i) a polycarbonate substrate;
(ii) an intermediate protective layer exhibiting barrier properties to plasticizer migration disposed on the outer surface of said substrate; and
(iii) a plasticized top layer which is relatively softer than said underlying polycarbonate disposed on said intermediate layer.

The polycarbonate resins utilized in the instant invention are well known in the art and are generally commercially available materials. These polycarbonates, as well as methods for their preparation, are described, inter alia, in U.S. Pat. Nos. 3,161,615; 3,220,973; 3,312,659; 3,312,660; 3,313,777; 3,666,614 and 3,989,672, all of which are hereby incorporated by reference. The polycarbonate resins may be prepared by the reaction of a dihydric phenol with a carbonate precursor using an interfacial polymerization process. Typically the dihydric phenols employed may be represented by the general formual

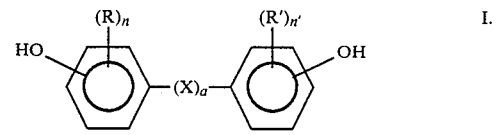

wherein:

X is selected from divalent hydrocarbon radicals,

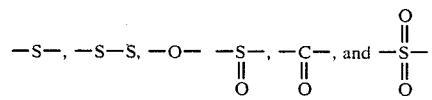

radicals;

each R is independently selected from halogen radicals, monovalent hydrocarbon radicals, and monovalent hydrocarbonoxy radicals;

each R' is independently selected from halogen radicals, monovalent hydrocarbon radicals, and monovalent hydrocarbonoxy radicals;

a is zero or one; and n and n' are independently selected from whole numbers having a value of from 0 to 4 inclusive.

The divalent hydrocarbon radicals represented by X include alkylene radicals, alkylidene radicals, cycloalkylene radicals, cycloalkylidene radicals, and arylene radicals. Preferably the divalent hydrocarbon radicals represented by X are those containing from 1 to about 15 carbon atoms. Some illustrative non-limiting examples of these radicals include ethylene, propylene, butylene, isopropylene, amylene, ethylidene, propylidene, amylidene, cyclohexylene, cyclohexylidene, phenylene, naphthylene, and methylphenylene.

When a is zero the two aromatic rings are directly joined with no intervening alkylene or or other bridging group.

The halogen radicals represented by R and R' include chlorine, bromine and fluorine, with chlorine and bromine being preferred.

The monovalent hydrocarbon radicals represented by R and R' include alkyl radicals, cycloalkyl radicals, aryl radicals, alkaryl radicals, and aralkyl radicals. The preferred monovalent hydrocarbon radicals are those containing from 1 to about 15 carbon atoms. Some illustrative non-limiting examples of these monovalent hydrocarbon radicals are methyl, ethyl, propyl, isopropyl, butyl, tertiarybutyl, pentyl, neopentyl, cyclopentyl, cyclohexyl, phenyl, naphthyl, butylphenyl, dimethylphenyl, and the like.

The monovalent hydrocarbonoxy radicals represented by R and R' may be represented by the general formula OR" wherein R" is a monovalent hydrocarbon radical of the type described for R and R'.

When more than one R substituent is present on the aromatic ring they may be the same or different. The same is true for the R' substituents.

Typical of some of the dihydric phenols that may be utilized to prepare the polycarbonate resins of the used in the practice of the instant invention are:
2,2-bis(4-hydroxyphenyl)propane (bisphenol-A);
bis(4-hydroxyphenyl)methane;
2,2-bis(4-hydroxy-3-methylphenyl)propane;
4,4-bis(4-hydroxyphenyl)heptane;
2,2-bis(4-hydroxy-3,5-dichlorophenyl)propane;
4,4'-thiodiphenol;
3,3'-dichloro-4,4'-dihydroxydiphenyl; and the like.

Other dihydric phenols are also available and are disclosed in U.S. Pat. Nos. 2,999,835; 3,028,365 and 3,334,154, all of which are incorporated herein by reference. Bisphenol-A is the preferred dihydric phenol.

It is, of course, possible to employ two or more different dihydric phenols rather than utilizing a single dihydric phenol in the preparation of the polycarbonate resins. Therefore, whenever the term dihydric phenol is used herein it is meant to include mixtures of two or more different dihydric phenols as well as individual dihydric phenols.

In addition to generally linear polycarbonates obtained by reacting the aforedescribed dihydric phenols with a carbonate precursor, branched polycarbonate resins may also be utilized. The branched polycarbonate resins may be prepared by reacting (i) at least one dihydric phenol of Formula I, (ii) a carbonate precursor, and (iii) a minor amount of a polyfunctional organic compound. The polyfunctional organic compounds used in making the branched polycarbonates are well known in the art and are disclosed, for example, in U.S. Pat. Nos. 3,525,712; 3,541,049; 3,544,514; 3,635,895; 3,816,373; 4,001,184; 4,294,953 and 4,204,047, all of which are hereby incorporated by reference. These polyfunctional organic compounds are generally aromatic in nature and contain at least three functional groups which may be, for example, hydroxyl, carboxyl, carboxylic anhydride, haloformyl, and the like. Some illustrative non-limiting examples of these polyfunctional compounds include trimellitic anhydride, trimellitic acid, trimellityl trichloride, 4-chloroformyl phthalic anhydride, pyromellitic dianhydride, mellitic acid, mellitic anhydride, trimesic acid, benzophenonetetracarboxylic acid, benzophenonetetracarboxylic anhydride, and 4,6-dimethyl-2,4,6-tri-(4-hydroxyphenyl)heptene-2. The amount of this polyfunctional compound or branching agent used is in the range of from about 0.05 to about 2 mole percent based on the amount of dihydric phenol employed, and preferably from about 0.1 to about 1 mole percent.

The carbonate precursor employed may be a carbonyl halide, a carbonate ester, or a bishaloformate. The carbonyl halides which may be employed are carbonyl bromide, carbonyl chloride, and mixtures thereof. Typical of the carbonate esters which may be employed herein are diphenyl carbonate; di(halophenyl)carbonates such as di(chlorophenyl)carbonate, di(bromophenyl)carbonate, di(trichlorophenyl)carbonate, etc.; di(alkylphenyl)carbonates such as di(tolyl)carbonate, etc.; di(naphthyl)carbonate; di(chloronaphthyl)carbonate; phenyl tolyl carbonate; chlorophenyl chloronaphthyl carbonate, etc., or mixtures thereof. The haloformates suitable for use as carbonate precursors include bis-haloformates of dihydric phenols such as bis-chloroformates of hydroquinone; bis-haloformates of glycols such as bis-haloformates of ethylene glycol, neopentyl glycol, etc. While other carbonate precursors will occur to those skilled in the art carbonyl chloride, also known as phosgene, is the preferred carbonate precursor.

In utilizing the interfacial polymerization process the polycarbonate polymers of this invention are generally prepared by employing a chain terminating agent, an acid acceptor, a catalyst, and an inert organic solvent which serves to dissolve the polycarbonate as it is formed.

The polycarbonate resin useful in the practice of the instant invention generally have a number average molecular weight in the range of from about 10,000 to about 60,000.

The intermediate layer which is disposed between the polycarbonate substrate and the soft outer coating is generally comprised of a thermoplastic material which exhibits barrier properties in order to prevent passage of the plasticizers from the soft outer coating to the underlying polycarbonate. The intermediate layer must exhibit several critical properties in order to be used in the articles of the instant invention. Fistly, it must be compatible with the underlying polycarbonate. That is to say it must not deleteriously affect the polycarbonate substrate. Secondly, it must be a thermoplastic material. Thirdly, it must be thermoformable. Fourthly, it must be heat resistant. More particularly, it must be heat resistant up to about 235° F. By heat resistant is meant that it not undergo any physical distortion at or below 235° F. And fifthly, it must exhibit barrier properties to the plasticizers contained in the soft top layer. By barrier properties is meant that it must, to a substantial degree, prevent or retard the migration of the plasticizers from the soft top coat to the polycarbonate substrate. Preferably, the intermediate layer should also exhibit gas-barrier properties. This is due to the fact that the article of the instant invention may be exposed to temperatures sufficient to volatilzie or partially volatilize some of the plasticizers contained in the top layer. This makes it necessary that the intermediate layer exhibit barrier properties to the plasticizers in both their gaseous and non-gaseous states.

In order for a material to be used as the intermediate layer in the instant invention it must meet all five of the criteria set forth hereinafore. Thus, for example, while some materials exhibit gas-barrier properties, are compatible with the polycarbonate, and are thermoplastic, they do not posses the requisite degree of thermoformability. This renders them unsuitable for use in the articles of the instant invention. Other materials, while exhibiting thermoformability and compatibility with polycarbonate, do not exhibit barrier properties. This also renders them unfit for use in the articles of the instant invention.

The intermediate layer may be comprised of a single monolithic ply of a material which meets the aforediscussed criteria; a plurality of plies of a material meeting these criteria; or a plurality of plies of different materials. If the intermediate layer contains a plurality of plies of different materials either at least one of these materials must contain all of the aforediscussed properties, or together the materials must contain, in combination, all of these properties.

The thickness of the intermediate layer must be sufficient for said layer to function as an effective barrier layer. That is to say the intermediate layer must be thick enough to prevent migration of the plasticizer from the soft top layer to the polycarbonate substrate. Generally, the intermediate layer must be at least about 0.5 mil thick, and preferably at least about 1 mil thick. The upper thickness range of the intermediate layer is not critical and is, therefore, controlled by secondary considerations such as cost, appearance, ease of manufacture, and the like.

A particularly useful intermediate layer is one comprised of a plurality of plies, more particularly of three plies. The central ply is comprised of nylon while the two outer plies are comprised of a polyolefin, with polyethylene being the preferred polyolefin. The central ply is fixed to the two outer plies by means of an adhesive tie layer disposed intermediate each outer ply and the central ply.

The top layer is one which is relatively softer and less brittle than the underlying polycarbonate substrate. This layer is comprised of a resinous material which is softer than polycarbonate resin. One of the main purposes of the top layer is to provide an aesthetically pleasing appearance to the coated article or part. An example of such a top layer is one which is comprised of polyvinyl chloride. The polyvinyl chloride can be used either alone or as a blend with other resins which enhance its softness and flexibility. Examples of these other resinous materials include, but are not limited to, the rubber modified polystyrenes and styrene containing polymers such as styrene-acrylonitrile (SAN), styrene-butadiene, acrylonitrile-butadiene-styrene graft copolymers (ABS), styrene-acrylonitrile-alpha-alkyl styrene polymers, poly-alpha-methyl-styrene, styrene-coumarin-indene, and the like.

A particularly useful top layer is one which is comprised of polyvinyl chloride and acrylonitrile-butadiene-styrene. Typically, such blends contain from about 1 to about 50 weight percent of the ABS resin and from about 50 to about 99 weight percent of the polyvinyl chloride.

The soft top or outer layer also contains plasticizers. The plasticizers are organic compounds well known to those skilled in the art which serve to plasticize or render flexible the resinous materials to which they are added. Some non-limiting illustrative examples of these plasticizers include dioctyl phthalate, diundecyl phthalate, heptyl phthalate, heptyl phthalate, undecyl phthalate, the adipate polyesters, and triheptyl nonyl phthalate. Other plasticizers are disclosed, inter alia, in U.S. Pat. Nos. 4,118,883 and 4,104,231, both of which are incorporated by reference. The plasticizers are generally present in amounts of from about 1 to about 50 parts by weight per hundred parts by weight of resin.

The top layers, intermediate layers, and the polycarbonate resin employed in the instant invention are generally all commercially available materials.

The structures of the instant invention may generally be made by first adhering or bonding the intermediate layer to the top layer and thereafter bonding or adhering these joined layers to the shaped polycarbonate resin substrate. The various resinous layers are bonded to each other by means of suitable adhesives. Any conventional adhesives may be used between the layers including, but not limited to, polyvinyl butyrals, ethylene terpolymers, epoxies, polyurethanes, silicones, acrylics, ethylene acrylic acids, and organopolysiloxane-polycarbonate block copolymers such as those desclosed in U.S. Pat. Nos. 3,189,662; 3,821,325 and 3,832,419.

DESCRIPTION OF THE PREFERRED EMBODIMENTS

In order to illustrate the present invention more fully, the following examples thereof are set forth. It is to be understood that these examples are illustrative only and are not to be construed as limiting the invention to the particular embodiments set forth therein. In the examples all parts and percents are by weight unless otherwise indicated.

The following examples illustrates a soft coated polycarbonate article of the instant invention.

EXAMPLE 1

A polycarbonate(derived from bisphenol-A and phosgene) izod bar is wrapped with a 2 mil thick intermediate layer film comprised of a three ply laminate containing an intermediate nylon ply and two outer poyethylene plies (marketed by the Crown Zellerbach Co. under the designation ZEELON 305). This intermediate layer wrapped polycarbonate is than wrapped in a soft plastcized polyvinyl chloride outer layer (Uniroyal Co.'s 6A expanded polyvinyl chloride) The wrapped polycarbonate bar is then affixed to stainless steel fixtures. The vinyl top coat is held in place with Hoffman swival-jar pinchocks. The sample is than placed in sealed glass jars, and kept at 235° F. for 12 weeks. The sample is then removed and the intermediate film and polycarbonate substrate subjected to visual inspection. The results are set forth in Table I.

The following examples illustrate structures falling outside the scope of the instant invention in that the intermediate layers utilized fail to meet one or more of the five criteria set forth above.

EXAMPLE 2

The procedure of Example 1 is substantially repeated except that the intermediate layer is comprised of a 1 mil thick polyester film (marketed by the E. I. du Pont Co. under the designation MYLAR).

EXAMPLE 3

The procedure of Example 1 is substantially repeated except that the intermediate layer is comprised of a 1 mil thick polyvinyl fluoride film (marketed by the E. I. du Pont Co. under the designation TEDLAR).

EXAMPLE 4

The procedure of Example 1 is substantially repeated except that the intermediate layer is comprised of a two ply laminate which is 2 mils thick and contains one ply of nylon 6 and one ply of polyvinylidene chlroide (marketed by the Allied Chemical Co. under the designation CAPRAN DFK).

EXAMPLE 5

The procedure of Example 1 is substantially repeated except that the intermediate layer is comprised of a nylon film 2 mils thick (marketed by the Allied Chemical Co. under the designation CAPRAN 80).

EXAMPLE 6

The procedure of Example 1 is substantially repeated except that the intermediate layer is comprised of a two ply laminate which is 2 mils thick and contains two plies of high density polyethylene (marketed by the St. Regis Co. under the designation CO-EX 100).

EXAMPLE 7

The procedure of Example 1 is substantially repeated except that the intermediate layer is comprised of a 5 mil thick film of acrylonitrile (marketed by the Vinyl Products Co. under the designation BAREX 210).

EXAMPLE 8

The procedure of Example 1 is substantially repeated except that the intermediate layer is comprised of a 1 mil thick film of polypropylene (marketed by the Steinerfilm Co.).

EXAMPLE 9

The procedure of Example 1 is substantially repeated except that the intermediate layer is comprised of a 1.15 mil thick film of polystyrene (marketed by the Dow Chemical Co. under the designation TRYCITE 7002).

EXAMPLE 10

The procedure of Example 1 is substantially repeated except that the intermediate layer is comprised of a 0.5 mil thick film of polyethylene (marketed by the E. I. du Pont Company under the designation MYLAR P25).

EXAMPLE 11

The procedure of Example 1 is substantially repeated except that the intermediate layer is comprised of an acrylic film which is 3 mils thick (marketed by the Georgia Pacific Co.).

EXAMPLE 12

The procedure of Example 1 is substantially repeated except that the intermediate layer is comprised of a two ply laminate containing one ply of high density polyethylene and one ply of low density polyethylene (marketed bu U.S.I. under the designation MULTIFILM M-16).

EXAMPLE 13

The procedure of Example 1 is substantially repeated except that the intermediate layer is comprised of a two ply laminate which is 1.5 mils thick and contains one ply of nylon and one ply of styrene (marketed by the Allied Chemical Co. under the designation CAPRAN ER-20).

EXAMPLE 14

The procedure of Example 1 is substantially repeated except that the intermediate layer is comprised of a 2.75 mil thick laminate comprised of an intermediate ply of ethylene vinyl acetate and two outer plies of Ionomer (marketed by U.S.I. under the designation MULTIFILM M-20). The Ionomer is a polyethylene having carboxylic acid salts grafted thereto (marketed by the E. I. du Pont Company under the designation SURLYN).

EXAMPLE 15

The procedure of Example 1 is substantially repeated except that the intermediate layer is comprised of a 1 mil thick film of polyester onto which has been vapor deposited an thin film of aluminum (marketed by the Steinerfilm Co.).

TABLE I

| Example No. | 12 weeks exposure at 235° F. |
|---|---|
| 1 | passed |
| 2 | intermediate layer exhibited deterioration, adequate barrier properties but poor heat resistance and thermoformability |
| 3 | chemical attack on polycarbonate - no barrier properties |
| 4 | intermediate layer exhibited deterioration, adequate barrier properties but inadquate heat resistance |
| 5 | intermediate layer exhibited deterioration, adequate barrier properties but inadequate heat resistance |
| 6 | chemical attack on polycarbonate - no barrier properties |
| 7 | intermediate layer exhibited deterioration, adequate barrier properties but inadequate heat resistance |
| 8 | chemical attack on polycarbonate - no barrier properties |
| 9 | chemical attack on polycarbonate - no barrier properties |
| 10 | polycarbonate shows severe clouding - no barrier properties |
| 11 | chemical attack on polycarbonate - no barrier properties |
| 12 | chemical attack on polycarbonate - no barrier properties |
| 13 | chemical attack on polycarbonate - no barrier properties |
| 14 | chemical attack on polycarbonate - no barrier properties |
| 15 | good barrier properties, however, very poor thermoformability |

As illustrated by the data in Table I in order to be effective in the instant invention the intermediate layer must exhibit all of the five properties mentioned hereinafore, i.e. thermoplasticity, thermoformability, heat resistance, plasticizer barrier properties, and compatability with the underlying polycarbonate substrate. Thus, while the polyester of Example 2 and the aluminum coated polyester of Example 15 exhibit good barrier properties (the underlying polycarbonate shows no evidence of chemical attack by or degradation due to the plasticizers) they are not suitable intermediate layers in the instant articles because they are difficult to thermoform. Likewise, while the acylonitrile of Example 7 and the nylon of Example 5 exhibit good barrier properties they are nevertheless not suitable for use as the intermediate layers in the instant invention because of their poor heat resistance (the films were badly distorted and exhibited evidence of deterioration after 12 weeks at 235° F.).

Numerous modifications and variations of this invention may be made without departing from the spirit and scope thereof. It is to be understood, therefore, that this invention is not to be limited to the embodiments disclosed herein except as defined in the appended claims

What is claimed is:

1. A soft top coated shaped polycarbonate article exhibiting improved protection of the polycarbonate to degradation by the plasticizers contained in the soft top coating comprising:
(i) a shaped substrate containing a polycarbonate resin;
(ii) an intermediate layer disposed on said polycarbonate containing substrate exhibiting plasticizer barrier properties, compatibility with the polycarbonate, thermoformability, thermoplasticity, and heat resistance up to about 235° F.; and
(iii) a relatively soft plasticized top coat comprised of at least one resinous material and at least one plasticizer disposed on said intermediate layer.

2. The article of claim 1 wherein said substrate, said intermediate layer, and said top coat are adhesively joined together.

3. The article of claim 1 wherein said top coat contains polyvinyl chloride.

4. The article of claim 3 wherein said top coat additionally contains a styrene resin.

5. The article of claim 4 wherein said styrene resin is a rubber modified styrene resin.

6. The article of claim 5 wherein said rubber modified styrene resin is acrylonitrile-butadiene-styrene resin.

7. The article of claim 1 wherein said intermediate layer is comprised of at least one nylon resin ply.

8. The article of claim 7 wherein said intermediate layer further contains at least one polyolefin ply.

9. The article of claim 8 wherein said polyolefin is polyethylene.

10. The article of claim 7 wherein said intermediate layer is comprised of a central nylon containing ply and two outer polyolefin plies.

11. The article of claim 10 wherein said polyolefin is polyethylene.

12. The article of claim 10 wherein said central nylon containing ply is adhesively joined to said two outer polyolefin plies.

* * * * *